United States Patent
Ding et al.

(10) Patent No.: US 12,299,237 B2
(45) Date of Patent: May 13, 2025

(54) ADAPTIVE PROXIMITY SENSING DELAY

(71) Applicant: Synaptics Incorporated, San Jose, CA (US)

(72) Inventors: Cungang Ding, Shanghai (CN); Yongmin Shen, Shanghai (CN); Junbo Yang, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 52 days.

(21) Appl. No.: 18/182,497

(22) Filed: Mar. 13, 2023

(65) Prior Publication Data

US 2024/0310955 A1    Sep. 19, 2024

(51) Int. Cl.
*G06F 3/041* (2006.01)
*G06F 3/044* (2006.01)

(52) U.S. Cl.
CPC ........ *G06F 3/04184* (2019.05); *G06F 3/0446* (2019.05); *G06F 2203/04108* (2013.01)

(58) Field of Classification Search
CPC ............... G06F 3/04184; G06F 3/0446; G06F 2203/04108
See application file for complete search history.

(56) References Cited

U.S. PATENT DOCUMENTS

| | | | | |
|---|---|---|---|---|
| 6,067,062 A * | 5/2000 | Takasu | ................. | G09G 3/3648 |
| | | | | 257/E27.111 |
| 6,593,562 B1 * | 7/2003 | Parrish | .............. | H01L 27/14609 |
| | | | | 348/246 |
| 8,441,226 B2 * | 5/2013 | Ju | ......................... | H01M 10/44 |
| | | | | 320/101 |
| 8,704,758 B1 * | 4/2014 | Figley | .................. | G06F 3/0383 |
| | | | | 345/156 |
| 9,869,768 B2 * | 1/2018 | Jeong | ..................... | G01B 11/24 |
| 10,402,009 B2 * | 9/2019 | De Araujo | ............ | G09G 5/395 |
| 10,564,718 B2 * | 2/2020 | Na | ........................... | G06T 7/514 |
| 10,691,228 B2 * | 6/2020 | Bae | ...................... | G06F 3/04166 |
| 10,969,877 B2 * | 4/2021 | Na | ......................... | G06F 3/0421 |
| 11,822,746 B1 * | 11/2023 | Kim | ....................... | G06F 3/0446 |
| 2007/0097358 A1 * | 5/2007 | Oon | ..................... | G09G 3/3413 |
| | | | | 356/218 |
| 2007/0190681 A1 * | 8/2007 | Lee | ................... | H01L 27/14689 |
| | | | | 438/54 |
| 2010/0141623 A1 * | 6/2010 | Nakanishi | ............ | G09G 3/3406 |
| | | | | 345/207 |
| 2011/0109605 A1 * | 5/2011 | Omori | .................. | G09G 3/3648 |
| | | | | 345/207 |

(Continued)

Primary Examiner — William Lu
(74) Attorney, Agent, or Firm — Leydig, Voit & Mayer, Ltd.

(57) ABSTRACT

An input device includes a proximity sensing panel including sensor electrodes and a proximity sensing circuit. The proximity sensing circuit is configured to acquire, for a sensing frame, sensing measurements of a sensing region using the sensor electrodes, process, for the sensing frame, the sensing measurements to obtain positional information, transmit the positional information to a processing system, and receive, from the processing system, vertical synchronization (Vsync) signal wait information responsive to the positional information. The proximity sensing circuit is further configured to adjust a sensing delay according to Vsync signal wait information.

23 Claims, 6 Drawing Sheets

(56) References Cited

U.S. PATENT DOCUMENTS

| | | | |
|---|---|---|---|
| 2011/0122098 A1* | 5/2011 | Kurokawa | G09G 3/20 250/214 R |
| 2011/0148835 A1* | 6/2011 | Yamazaki | G09G 3/2003 345/207 |
| 2011/0273413 A1* | 11/2011 | Woestenborghs | G09G 3/3611 345/207 |
| 2011/0315859 A1* | 12/2011 | Tanaka | G09G 3/3648 250/214 R |
| 2012/0091321 A1* | 4/2012 | Tanaka | G06F 3/042 250/208.2 |
| 2012/0112047 A1* | 5/2012 | Brown | G06F 3/0412 250/214.1 |
| 2014/0062899 A1* | 3/2014 | Lee | G06F 3/0446 345/173 |
| 2014/0204036 A1* | 7/2014 | Schillings | G06F 3/0418 345/173 |
| 2014/0210775 A1* | 7/2014 | Ota | G06F 3/04184 345/173 |
| 2014/0253539 A1* | 9/2014 | Kline | G09G 3/3233 345/82 |
| 2015/0355774 A1* | 12/2015 | Johansson | G06F 3/04166 345/173 |
| 2016/0342262 A1* | 11/2016 | Qian | G06F 3/04166 |
| 2017/0277345 A1* | 9/2017 | Agematsu | G06F 3/0445 |
| 2017/0287392 A1* | 10/2017 | Lynch | G06F 3/0421 |
| 2017/0323481 A1* | 11/2017 | Tran | H04N 23/611 |
| 2018/0011598 A1* | 1/2018 | Ku | G06F 3/04166 |
| 2018/0101035 A1* | 4/2018 | Marotta | G09G 3/3406 |
| 2018/0173336 A1* | 6/2018 | Karuppusamy | G06F 3/0445 |
| 2018/0184031 A1* | 6/2018 | Morita | H04N 25/76 |
| 2018/0349667 A1* | 12/2018 | Kim | G09G 5/00 |
| 2020/0258448 A1* | 8/2020 | Hargreaves | G09G 3/3208 |
| 2021/0090523 A1* | 3/2021 | Huang | G06F 3/0421 |
| 2021/0104574 A1* | 4/2021 | Behringer | H01L 33/10 |
| 2021/0134855 A1* | 5/2021 | Ghasemi | C12Q 1/6869 |
| 2021/0149540 A1* | 5/2021 | Shikata | G09G 3/20 |
| 2021/0398486 A1* | 12/2021 | Hamaguchi | G09G 3/3233 |
| 2022/0102583 A1* | 3/2022 | Baumheinrich | G02B 6/12004 |
| 2022/0155144 A1* | 5/2022 | Malinge | G09G 3/3225 |
| 2022/0229501 A1* | 7/2022 | Suo | G06F 3/042 |
| 2022/0244829 A1* | 8/2022 | Lee | G06F 3/0412 |
| 2023/0215365 A1* | 7/2023 | Lee | G06F 21/32 345/204 |
| 2023/0316988 A1* | 10/2023 | Hofrichter | G09G 3/32 345/55 |
| 2023/0325027 A1* | 10/2023 | Shiomura | G09G 3/20 345/174 |

* cited by examiner

ADAPTIVE PROXIMITY SENSING DELAY

FIELD

The disclosed technology generally relates to devices and methods for proximity sensing to display latency reduction in input-display devices.

BACKGROUND

Input-display devices adapted to both image displaying and proximity sensing are widely used as user-interfaces of electronic systems. An input-display device may include a display panel and an array of sensor electrodes disposed neighboring or integrated in the display panel. The input-display device may be configured to display an image on the display panel while sensing one or more input objects located on or near the display panel based on resulting signals received from the sensor electrodes.

The sensing of one or more input objects located on or near the display panel often triggers an update of the display. For example, in a finger scrolling interface, the movement of a finger from the top to the bottom of a touchscreen triggers a scrolling of the interface being displayed. Other detections of input objects proximate to the sensing region may cause a different update of the display. However, a latency exists between the detection and the display update due to the time for a processing system to process the detection and the waiting time until a next update of the display.

SUMMARY

In general, in one aspect, one or more embodiments relate to an input device that includes a proximity sensing panel including sensor electrodes and a proximity sensing circuit. The proximity sensing circuit is configured to acquire, for a sensing frame, sensing measurements of a sensing region using the sensor electrodes, process, for the sensing frame, the sensing measurements to obtain positional information, transmit the positional information to a processing system, and receive, from the processing system, vertical synchronization (Vsync) signal wait information responsive to the positional information. The proximity sensing circuit is further configured to adjust a sensing delay according to Vsync signal wait information.

In general, in one aspect, one or more embodiments relate to an input-display device that includes a proximity sensing panel including sensor electrodes and a proximity sensing circuit. The proximity sensing circuit is configured to acquire, for a sensing frame, sensing measurements of a sensing region using the plurality of sensor electrodes, transmit positional information determined from sensing measurements to a processing system, receive, from the processing system, Vsync signal wait information responsive to the positional information, the Vsync signal wait information defining a time to a Vsync signal, and adjust a sensing delay according to Vsync signal wait information. The input-display device further comprises a display driver configured to display, at a time defined by the Vsync signal, an image generated based on the positional information.

In general, in one aspect, one or more embodiments relate to a method acquiring, for a sensing frame, sensing measurements of a sensing region, processing, for the sensing frame, the sensing measurements to obtain positional information, and transmitting the positional information to a processing system. The method further includes receiving, from the processing system, Vsync signal wait information responsive to the positional information and adjusting a sensing delay according to Vsync signal wait information.

Other aspects of the invention will be apparent from the following description and the appended claims.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified, and details or components omitted for clarity of presentation and explanation. The drawings and discussion serve to explain principles discussed below, where like designations denote like elements.

DETAILED DESCRIPTION

In general, embodiments are directed to reducing the latency between the detection of an input object proximate to the sensing region and an update to the display. To reduce the latency, a sensing delay is added prior to the operating of the sensor electrodes. Specifically, sensor electrodes transmit sensing signals to obtain measurements of a sensing region. The measurements may be indicative of an input object in the sensing region. The measurements are processed to identify positional information of the input object. The positional information is transmitted to a processing system that generates an image to display based on the positional information. The update to the display is delayed until a vertical synchronization (Vsync) signal that triggers the update to the display. Thus, to a user, latency exists from the time that the user provides input to the time the display is updated.

In order to minimize the latency, the processing system reports Vsync signal wait information, identifying the delay time, to the proximity sensing controller that controls the operation of the sensor electrodes. The proximity sensing controller then adjusts the sensing delay based on the Vsync signal wait information. For example the added sensing delay may be from 0 milliseconds (ms) to 0.2 ms. The adaptability allows for the system to manage different processing times by the processing system.

Figure 1A:
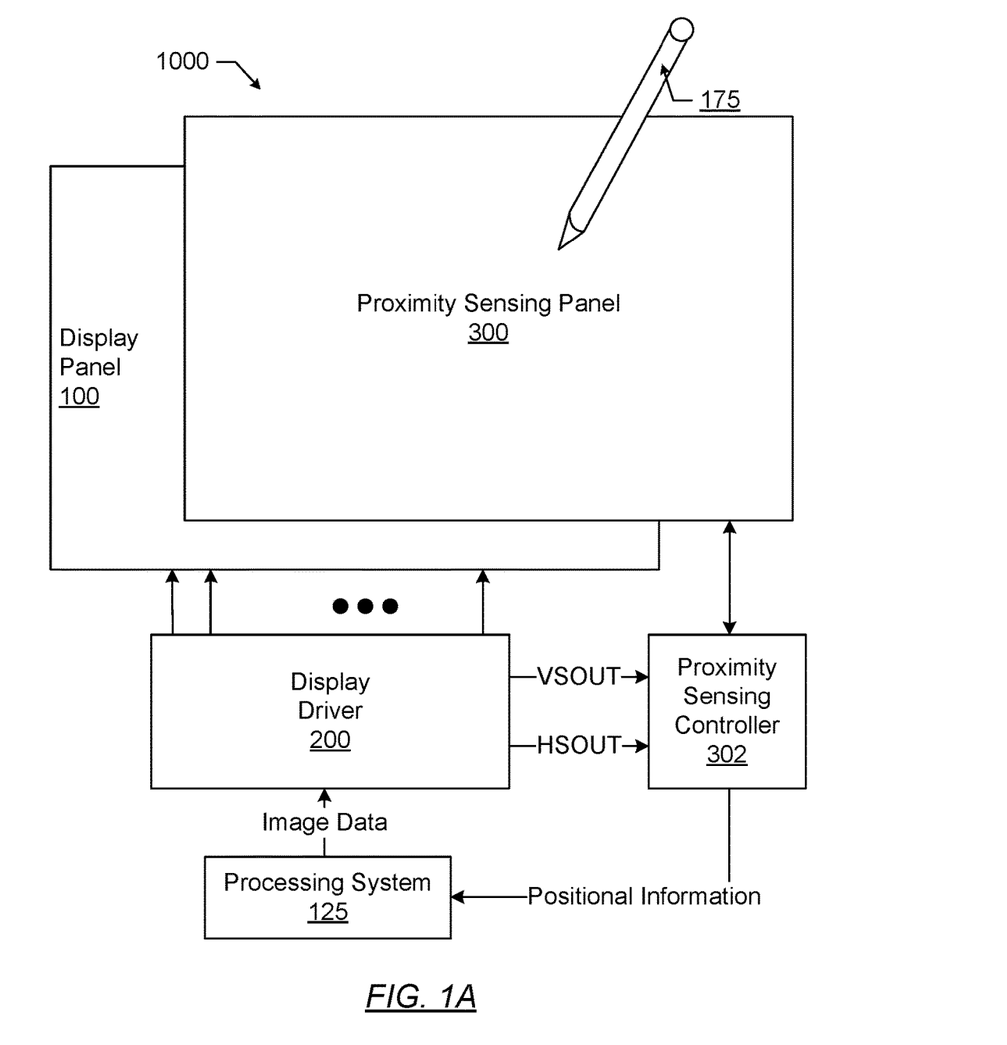
FIG. 1A shows an example configuration of an input-display device, according to one or more embodiments.
Figure 1B:
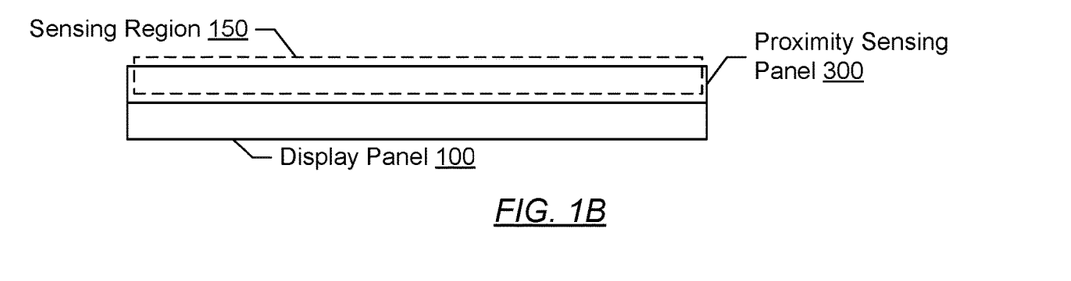
FIG. 1B shows an example side view of the input-display device, according to one or more embodiments.

Turning to the figures, FIG. 1A shows a diagram of a system in accordance with one or more embodiments. Specifically, FIG. 1A shows a diagram of an input-display device (1000). Input-display devices, such as shown in FIG. 1A, are adapted to both image displaying and proximity sensing. An input device refers to at least an input portion of the input-display device. Input-display devices are often used as user-interfaces of electronic systems. The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), mobile phones and devices, electronic wearable devices, gaming devices, Internet of Things (IoT) devices. Other examples include automotive user interfaces configured to give drivers user interface capabilities. An input-display device may include a display panel (100) and a proximity sensing panel (300) having sensor electrodes disposed neighboring or integrated in the display panel (100). The input-display device (1000) may be configured to display an image on the display panel (100) while sensing one or more input objects located on or near the display panel (100) based on resulting signals received from the sensor electrodes.

In addition to the display panel (100) and proximity sensing panel (300), the input-display device (1000) includes a display driver (200) and a proximity sensing controller (302). The display panel (100) is coupled to the display driver (200), and the proximity sensing panel (300) is coupled to the proximity sensing controller (302).

The display driver (200) and the proximity sensing controller (302) are further coupled to a processing system (125). In one or more embodiments, the processing system (125) is a part of the electronic system. The processing system is one or more hardware processor(s) that executes computer instructions using positional information of any input objects in a sensing region as input and generates an updated image that the processing system transmits to the display as output. The processing system may also be configured to update information in storage based on the positional information. Examples of the processing system (125) include an application processor, a central processing unit (CPU), a special purpose processor, a graphical processing unit (GPU) and other types of processors. Although shown skewed in FIG. 1A, as shown in FIG. 1B, the proximity sensing panel (300) is disposed on or near the display panel (100) and at least partially overlapping the display panel (100). The proximity sensing panel (300) defines the sensing region (150) where input objects may be detected. The sensing region is any area in which input objects may be detected including a touch surface and an area adjacent to the touch surface.

Figure 2:
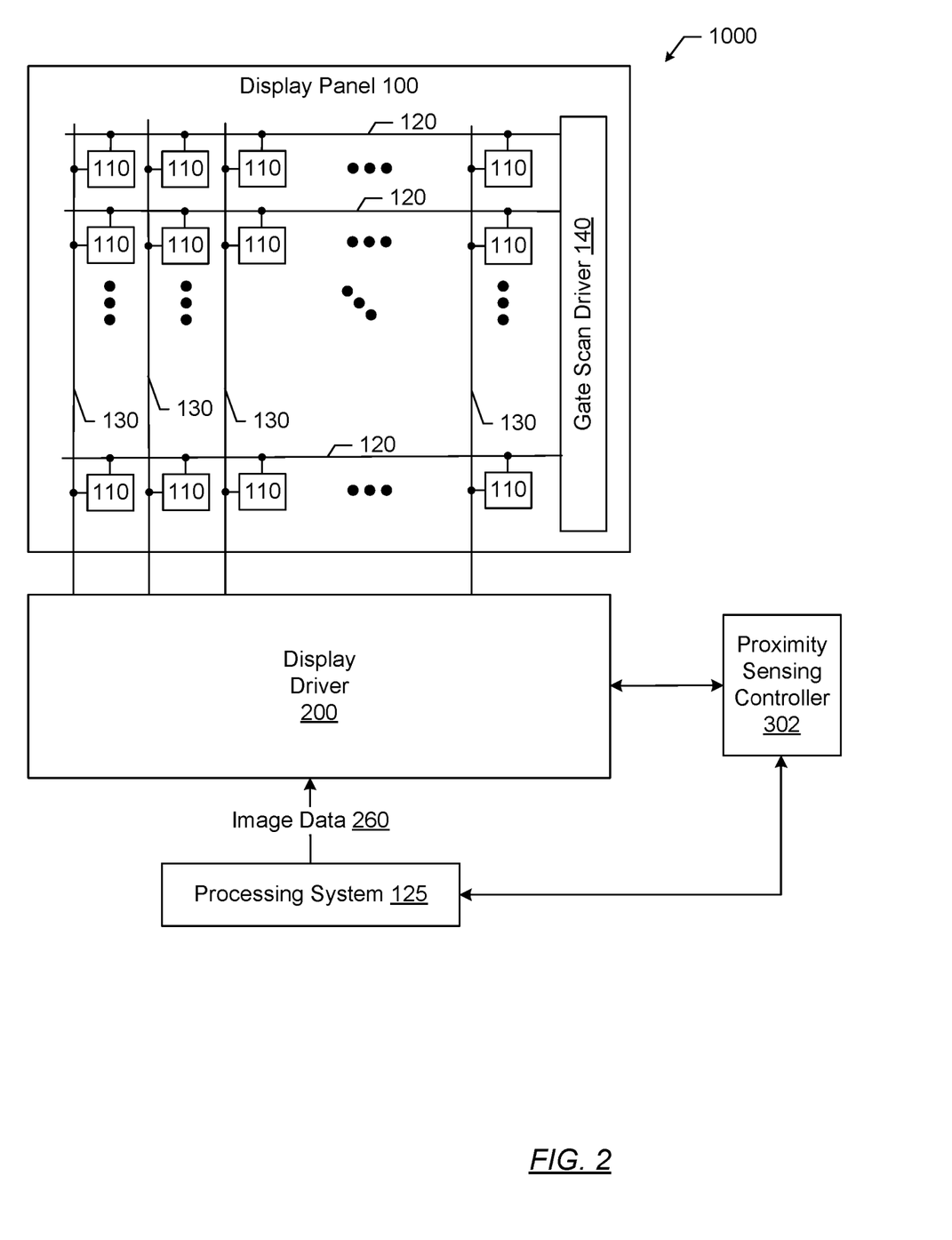
FIG. 2 shows an example configuration of a display panel, according to one or more embodiments.

FIG. 2 shows an example configuration of the display panel (100), according to one or more embodiments. The display panel (100) may be any type of dynamic display capable of displaying a visual interface to a user. Examples of the display panel (100) include organic light emitting diode (OLED) display panels, micro light emitting diode (LED) display panels and liquid crystal display (LCD) panels. In the shown embodiment, the display panel (100) includes display elements (110) (e.g., pixel circuits), gate lines (120) (also referred to as scan lines), source lines (130) (also referred to as data lines), and a gate scan driver (140). Each display element (110) may include an OLED pixel, a micro LED pixel, an LCD pixel, or a different type of pixel. Each display element (110) is coupled to the corresponding gate line (120) and source line (130). The source lines (130) may be configured to provide data voltages to display elements (110) of the display panel (100) to update (or program) the display elements (110) with the data voltages. The gate lines (120) are used to select rows of display elements (110) to be updated with the data voltages. Thus, when display elements (110) of a selected row is to be updated, the gate scan driver (140) asserts the gate line (120) coupled to the display elements (110) of the selected row.

The display panel (100) may further include other components and signal lines depending on the display technology. In embodiments where an OLED display panel is used as the display panel (100), for example, the display panel (100) may further include emission lines that control light emission of the display elements (110) and power lines that delivers a power supply voltage to the respective display elements (110).

The display driver (200) is configured to drive the source lines (130) of the display panel (100) based on image data (260) received from the processing system (125). The image data (260) corresponds to an image to be displayed on the display panel (100). The image data (260) may include gray levels of the respective display elements (110) of the display panel (100). The display driver (200) is configured to generate data voltages for the respective display elements (110) based on the image data (126) received from the processing system (125) and provide the generated data voltages to the respective display elements (110) via the source lines (130).

Update of the display is based on a Vsync signal, a horizontal synchronization (Hsync) signal, and a clock (CLK) signal. The Vsync signal initiates a Vsync period. The Vsync period is the start of a display of a new image. The Hsync signal initiates the start of each Hsync period, which is within a Vsync period.

The display driver (200) may also be configured to communicate information with the proximity sensing controller (302). For example, the information may be used to perform synchronization between the display driver (200) and the proximity sensing controller (302).

Figure 3:
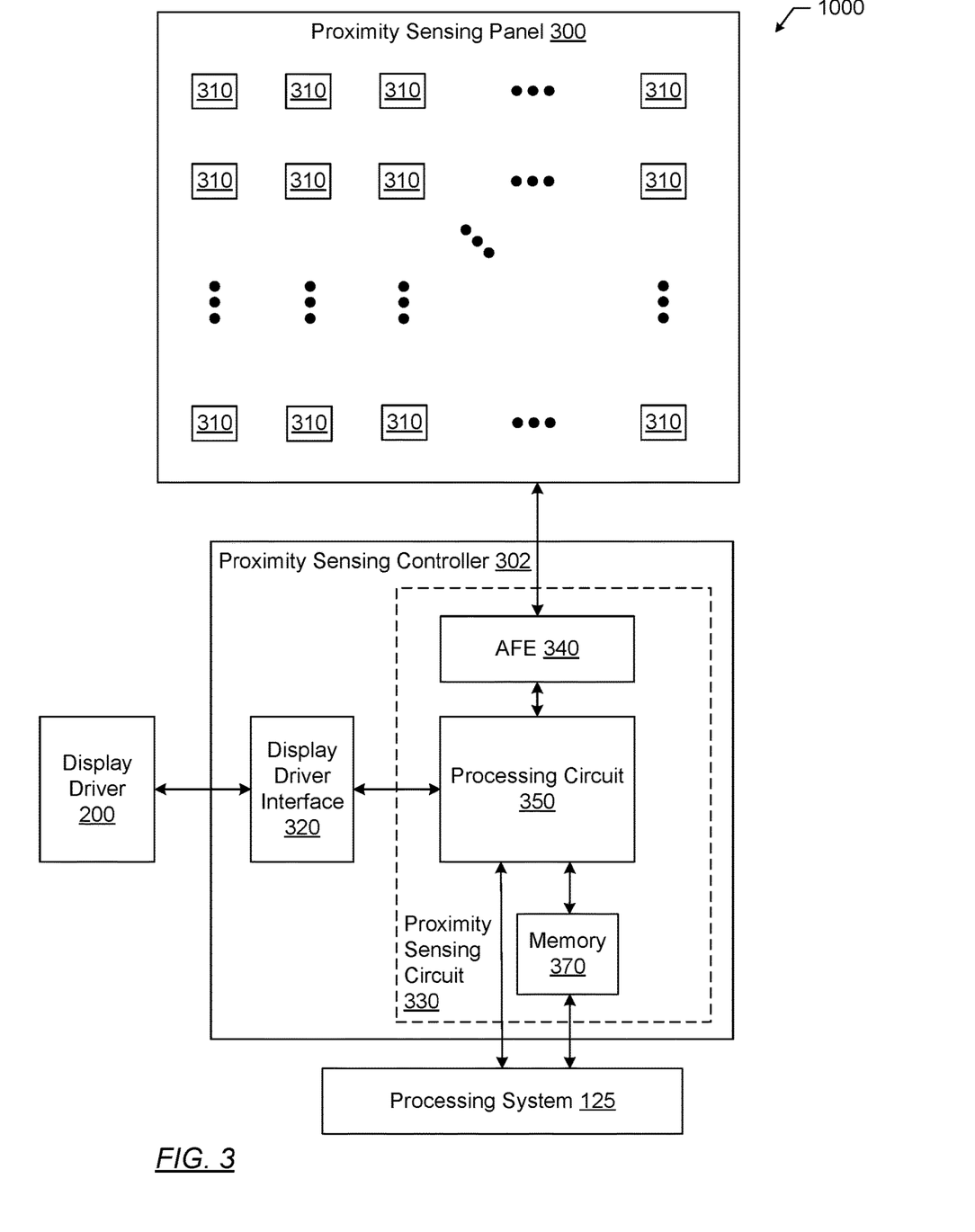
FIG. 3 shows an example configuration of a proximity sensing panel, according to one or more embodiments.

FIG. 3 shows an input device of an input-display device. In the shown embodiment, the proximity sensing panel (300) includes an array of sensor electrodes (310) disposed over the display panel. The sensor electrodes (310) are used for proximity sensing to detect one or more input objects located on or near the proximity sensing panel (300). As used herein, proximity sensing includes touch sensing (e.g., contact on the proximity sensing panel (300) and/or the display panel (100)) as well as sensing of input objects that are not in physical contact with the display panel. Examples of input objects include user's fingers and styli (e.g., capacitive pens). While twelve sensor electrodes (310) are shown in FIG. 3, the proximity sensing panel (300) may include more or less than twelve sensor electrodes (310). Further, while FIG. 3 shows the sensor electrodes (310) are rectangular, the sensor electrodes (310) may be shaped in a different shape, such as triangular, square, rhombic, hexagonal, irregular, or other shapes. Further, sensor electrodes may be configured in a variety of different configuration patterns, including bars that span vertically and/or horizontally across the panel.

The proximity sensing controller (302) is configured to drive the sensor electrodes (310) with sensing signals and receive resulting signals. The resulting signals include the effects of any input objects present in the sensing region. The driving of the sensor electrodes (310) and the receiving of resulting signals to capture a snapshot of the sensing region is referred to as a sensing frame. Namely, a sensing frame is for a snapshot of the sensing region in which all input objects are presumed stationary. A sensing frame may include the transmission of multiple sensing signals in several bursts, such as for error and noise cancelling. However, the sensing frame captures a state of the sensing region with respect to input objects for a single moment in time.

The proximity sensing controller (302) is configured to sense one or more input objects based on the resulting signals received from the sensor electrodes (310) and generate positional information of the one or more sensed input objects. "Positional information" as used herein broadly encompasses absolute position, relative position, velocity, acceleration, and other types of spatial information. The proximity sensing controller (302) is configured to determine positional information for a single point in time (e.g., a size and position of an input object) using a single frame. The proximity sensing controller (302) is configured to determine positional information that spans multiple points in time using multiple frames. For example, historical data regarding one or more types of positional information may also be determined and/or stored, including, for example, historical data that tracks position, motion, or instantaneous velocity over time. The generated positional information is sent to the processing system (125).

In one or more embodiments, the proximity sensing controller (302) is configured to sense one or more input objects through capacitive proximity sensing. Some capacitive proximity sensing implementations utilize "absolute capacitance" (also often referred to as "self-capacitance") sensing methods based on changes in the capacitive coupling between the sensor electrodes (310) and an input object. In various embodiments, an input object near the sensor electrodes (310) alters the electric field near the sensor electrodes (310), thus changing the capacitive coupling. The resulting signals acquired from the sensor electrodes (310) include effects of the changes in the capacitive coupling. In one implementation, an absolute capacitance sensing method operates by modulating the sensor electrodes (310) with respect to a reference voltage, e.g., system ground, and by detecting the capacitive coupling between the sensor electrodes (310) and input objects.

Some capacitive proximity sensing implementations utilize "transcapacitance" (also often referred to as "mutual capacitance") sensing methods based on changes in the capacitive coupling between transmitter electrodes (not shown) and the sensor electrodes (310). In various embodiments, an input object near the sensor electrodes (310) alters the electric field between the transmitter electrodes and the sensor electrodes (310), thus changing the capacitive coupling. In one implementation, a transcapacitance sensing method operates by detecting the capacitive coupling between one or more transmitter electrodes and one or more sensor electrodes (310). The coupling may be reduced when an input object coupled to a system ground approaches the sensor electrodes (310). Transmitter electrodes may be modulated relative to a reference voltage, e.g., system ground. The transmitter electrodes may be a subset of the sensor electrodes (310) or separate sensor electrodes. Further, which sensor electrodes are used as transmitter electrodes and which sensor electrodes are used as receiver electrodes may change. The receiver electrodes (310) may be held substantially constant relative to the reference voltage or modulated relative to the transmitter electrodes to facilitate receipt of resulting signals.

Continuing with the proximity sensing controller (302), the proximity sensing controller (302) includes a display driver interface (320) connected to a proximity sensing circuit (330). In one or more embodiments, the display driver interface (320) is a general purpose I/O interface (GPIO) that is connected to the display driver (200) to receive and transmit information. The display driver interface (320) is configured to communicate with a processing circuit (350) in the proximity sensing circuit (330).

In one or more embodiments, the proximity sensing circuit (330) includes an analog front end (AFE) (340), a processing circuit (350), and memory (370). The AFE (340) is configured to receive resulting signals from the sensor electrodes (310) and generate analog-to-digital conversion (ADC) data corresponding to the resulting signals. Generating the ADC data may include conditioning (filtering, baseline compensation, and/or other analog processing) of the resulting signals and analog-to-digital conversion of the conditioned resulting signals. In embodiments where the resulting signals from the sensor electrodes (310) are acquired in a time divisional manner, the AFE (340) may be configured to provide guarding voltage (Vguard) to sensor electrodes (310) from which resulting signals are not currently acquired. In embodiments where the proximity sensing is achieved through transcapacitive sensing from the transmitter electrodes in the proximity sensing panel (300), the AFE (340) may be configured to provide transmitter signals to the transmitter electrodes. The operation of the AFE (340) may be controlled based on one or more register values received from the processing circuit (350).

The processing circuit (350) is configured to trigger a driving of the sensor electrodes (310) for a sensing frame. Further, the processing circuit (350) is configured to generate and adjust a sensing delay before the driving of the sensor electrodes (310). The sensing delay is an adjustable time period by which the sensor electrodes (310) are not driven as part of a sensing frame.

The processing circuit (350) may trigger the driving of a set of sensing frames. The set of sensing frames may be an uninterrupted sequence of sensing frames. As another example, the set of sensing frames may be performed at a predefined interval. Within the set of frames or before the initial frame in the set, the processing circuit (350) is configured to trigger the sensing delay.

The processing circuit (350) is configured to process the resulting signals and determine a presence of an input object. The processing circuit (350) is configured to generate positional information of one or more input objects in the sensing region based on the resulting signals acquired from the sensor electrodes (310). In one implementation, the processing circuit (350) may be configured to process the ADC data, which correspond to the resulting signals acquired from the sensor electrodes (310), to generate the positional information. The processing circuit (350) may include a processor, such as a micro control unit (MCU), a central processing unit (CPU) and other types of processors, and firmware. The processing circuit (350) may be further configured to control the overall operation of the proximity sensing controller (302), including controlling the AFE (340).

The processing circuit (350) is configured to store the positional information in memory (370). The processing circuit (350) is further configured to trigger an attention (attn) signal to the processing system (125). An attn signal is a change in voltage on an attention line connected to the processing system (125) indicating that new data is available for processing system (125). The memory (370) is hardware storage that has shared access between the processing sensing controller (302) and the processing system (125). Although the memory (370) is shown as being on the processing sensing controller (302), the memory (370) may be part of the electronic device and connected to the processing system (125) (e.g., as local memory of the processing system).

Figure 4:
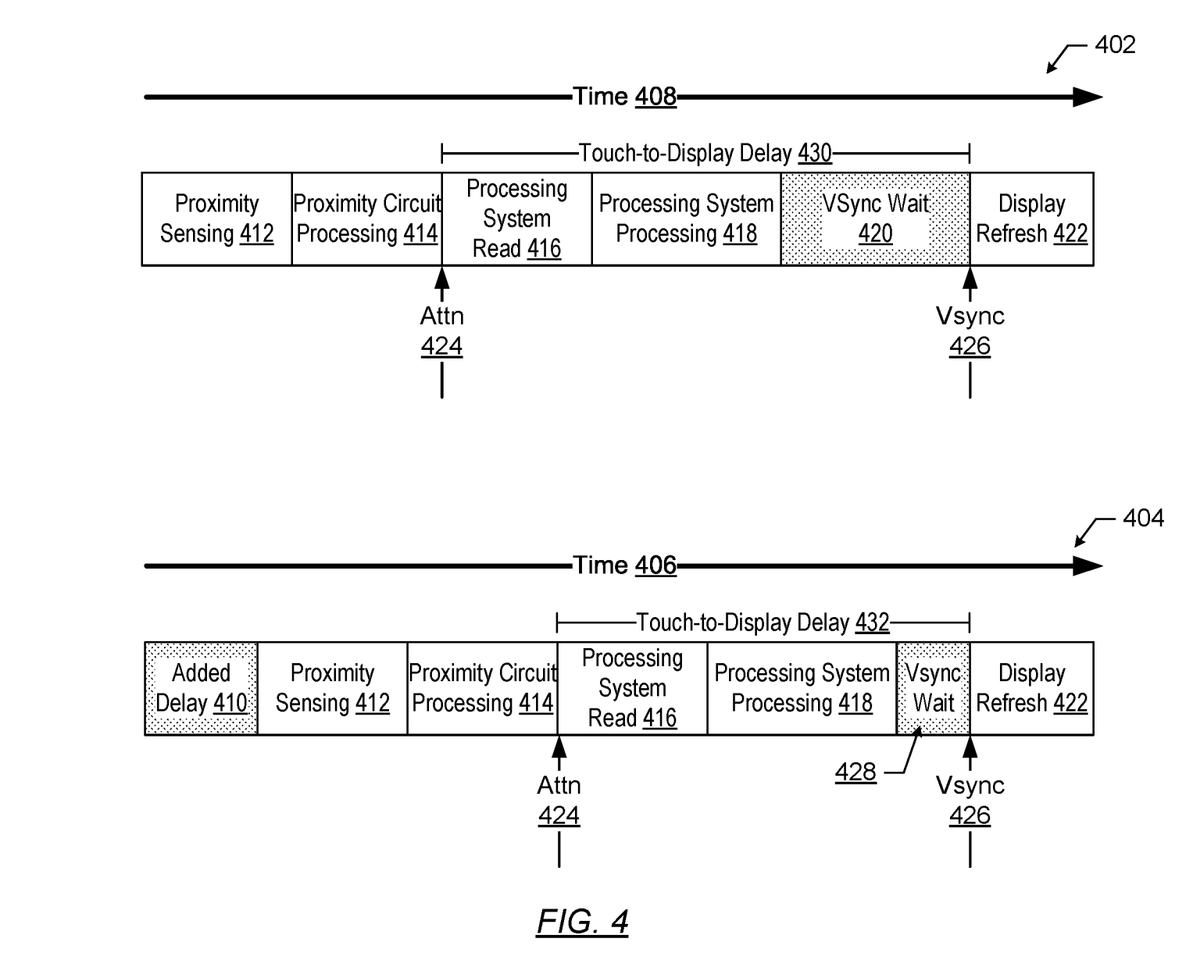
FIGS. 4 and 5 show example timing diagrams according to one or more embodiments.
Figure 5:
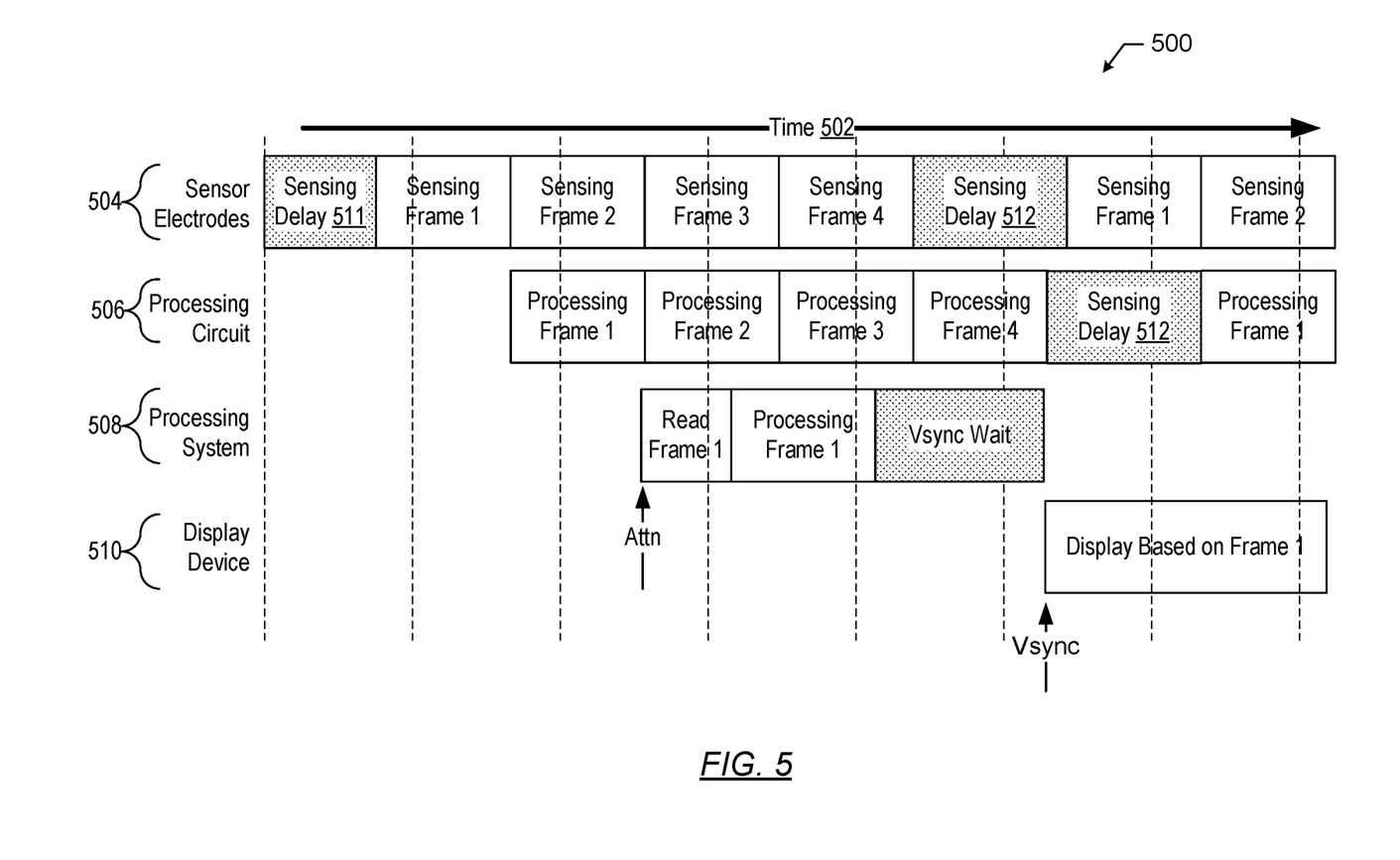

FIGS. 4 and 5 show example timing diagrams in accordance with one or more embodiments. Turning to FIG. 4, a first timing diagram (402) and a second timing diagram (404) are shown. In the timing diagrams, operations are performed in order from left to right as shown by the line demarking the time (406 and 408). The first timing diagram (402) shows an example timing without an added sensing delay while the second timing diagram (404) shows the proximity sensing with an added delay (410).

As shown in the first timing diagram (402), the proximity sensing circuit performs the proximity sensing frame at an interval. Starting with the left side of the first timing diagram (402), the proximity sensing circuit performs proximity sensing (412) of the sensing region for a sensing frame. To perform the proximity sensing, the proximity sensing circuit acquires measurements of the sensing region by driving the sensor electrodes with sensing signals. For example, the proximity sensing circuit may perform at least one of transcapacitive and absolute capacitive sensing of the sensing region.

The proximity circuit processes (414) the measurements to obtain positional information. Processing the measurements by the proximity circuit may include accounting for noise and background capacitance (e.g., when no input object is in the sensing region). The processing may also include detecting the location and size of input objects, mitigating for palms and other large objects that may be present in the sensing region, and performing other operations. Further, positional information and measurements acquired from previous sensing frames may be combined with measurements of the current frame to perform noise mitigation and to determine positional information over time. The result of the processing is positional information for the current frame that is stored in memory.

After processing, an attention signal attn (424) is transmitted to the processing system. The processing system reads (416) the positional information from memory. Further, the processing system processes (418) the positional information. The processing of the positional information is time variable depending on the current workload of the processing system, the positional information, any background applications executing, and the application that is triggering the update to the image. Thus, the length of time to perform processing system processing (418) may be vary across sensing frames. However, because between consecutive sensing frames, the same application may be executing and the processing system may be performing similar workload, the difference in time variance may not be high. Namely, over time, the processing system processing time may vary while staying relatively constant between sensing frames. The result of the processing system processing (418) is an image in the form of image data that is transmitted to the display driver.

At this stage, the system has a VSync wait time (labeled Vsync wait (420) in FIG. 4) for the next Vsync signal (426). While waiting for the next Vsync signal (426), the processing system may perform other processing tasks. However, during the VSync wait time (420) for the next Vsync signal (426), the previous image is displayed.

At the Vsync signal (426), the display refresh period (422) is initiated. During the display refresh period (422), the display device is updated with new image that is outputted by the processing system. Thus, the user input has a delay before the display refresh is performed based on the user input. The delay may be referred to as touch-to-display delay (430) and is the amount of time from the proximity circuit completing processing (414) to the time of the Vsync signal (426).

The second timing diagram (404) shows how an added sensing delay (410) can reduce the touch-to-display delay (432). In the second timing diagram (404), like numbered components have a same length of time and are the same as the first timing diagram (402). As shown, the added sensing delay (410) moves some of the time to wait for the next Vsync signal (426) prior to performing the proximity sensing (412). The result is that the touch-to-display delay (432) is shorter than the touch-to-display delay (430) in the first timing diagram (402).

Notably, at the time of the added delay (410), the system does not know the length of time of the wait for the next Vsync signal (426) for the current frame because the time for the processing system processing (418) is unknown. Thus, the amount of time in the added delay (410) is an estimate of the time to wait for the next Vsync signal (426) based on respective wait times for prior frames. Further, because a worse touch-to-display delay (432) could occur if the processing system processing (418) exceeds the next Vsync signal (426), the estimate for the added delay should be less than VSync wait time (420).

In order to generate the initial added sensing delay, the processing circuit uses a prior Vsync wait information that is transmitted from the processing system to the processing circuit. Specifically, once the processing system completes processing, the processing system outputs the Vsync wait information to the proximity sensing controller for processing by the processing circuit. The Vsync wait information defines the Vsync wait time (428). Thus, the Vsync wait information defines a time difference between processing the positional information and a display update.

Different methods may be used for the Vsync wait information to define the Vsync wait time (428). In a first example, the Vsync wait information explicitly specifies the Vsync wait time. In a second example, the Vsync wait information may be a current time indicative of processing being completed, such as using a processing completion signal. In such a scenario, the processing circuit may determine the Vsync wait time (428) by calculating a difference between a next Vsync signal received by the processing circuit and the processing completion signal.

For generating the initial added sensing delay, the processing circuit may use a fraction of the Vsync wait time. For a subsequent added sensing delay, the processing circuit may adjust the added sensing delay. Adjusting the added sensing delay may be performed as follows. The processing circuit determines whether the Vsync wait time is greater than a high threshold. If the Vsync wait time is greater than a high threshold, the processing circuit determines a result of a function of a Vsync wait time and adds the result to the sensing delay. For example, the function may be to take a percentage of the Vsync wait time, such as ten percent or thirty percent, and adds the result to the current sensing delay. If the Vsync wait time is less than a low threshold, then the added sensing delay is decreased by the difference between the Vsync wait time and the low threshold in one or more embodiments. The above provides a few examples of how the Vsync wait time may be adjusted. Other techniques may be used to adjust the Vsync wait time without departing from the scope of the claims.

During or immediately after the display refresh period (422), the next sensing frame may be performed. To perform the next sensing frame, the operations of the second timing diagram (404) repeats starting with the added sensing delay. In some cases, the adjusted sensing delay is used for the immediately succeeding sensing frame of the current sensing frame. In such a scenario, the added delay for the next sensing frame is an adjusted delay adjusted from the immediately preceding sensing frame. In other cases, the adjusted sensing delay is used for a succeeding sensing frame after calculation of the adjustment completes, which may not be the immediately succeeding sensing frame.

FIG. 4 shows timing diagrams for a single sensing frame being performed for each display refresh. In some cases, a set of multiple sensing frames may be performed between display refresh. For example, the sensing frame rate may be greater than the display refresh rate.

FIG. 5 shows a timing diagram (500) for performing a set of sensing frames between consecutive Vsync signals and for reducing the Vsync wait time. The additional sensing frames may be performed for internal processing (e.g., to obtain extra noise measurements, or determine velocity, or perform other functions). As shown by time line (502), the time extends from left to right. Each row of the timing diagram (500) corresponds to a different component of the system. Specifically, the first row (504) shows operations of the sensor electrodes, the second row (506) shows operations of the processing circuit, the third row (508) shows operations of the processing system, and the fourth row (510) shows operations of the display device. Operations that are horizontally aligned in the example timing diagram (500) occur at the same time. The dashed vertical lines are just guidelines for ease of viewing the timing diagram.

As shown in the first row (504), for each issuance of a Vsync signal, the sensor electrodes perform a set of sensing frames. In the shown example, the sensing delay (511) is added before the initial sensing frame (i.e., sensing frame 1). However, the sensing delay may be added before an intermediate sensing frame (e.g., before sensing frame 2, sensing frame 3, or sensing frame 4). Although FIG. 5 shows the set of sensing frames as having only four sensing frames, more or fewer sensing frames may be performed in the set of sensing frames.

As shown in the second row (506), the processing circuit processes the sensing frames consecutively as each sensing frame is completed. In one or more embodiments, the processing circuit processes at a same rate as the sensor electrodes. Thus, the sensing delay in the sensor electrodes causes a sensing delay in the processing circuit. As discussed in reference to FIG. 4, when the processing system completes processing a sensing frame and stores positional information, the processing circuit triggers an attn signal to the processing system shown in the third row (508). In one or more embodiments, the processing circuit triggers the attn signal only for Sensing Frame 1. The processing circuit may use the measurements from the remaining sensing frames in the set of sensing frames for other purposes. By not triggering the attn signal for each sensing frame, the system reduces the amount of processing resources of the processing system that are used for processing frames.

For example, by only having the attn signal for the first frame, one or more embodiments provide for a gaming mode. To perform the gaming mode, the touch sensing frame rate is higher than the Vsync rate. Thus, some frames are not reported. Frames that are not reported may be used to improve touch sensing, such as to detect noise. By way of a more specific example, the touch sensing frame rate can be two times (e.g., 240 Hz) or four times (e.g., 480 Hz) the Vsync rate. FIG. 5 shows the example in which the touch sensing frame rate is four times the Vsync rate. In the four times touch sensing rate, "Frame 1" is reported while Frames 2, 3, and 4 are not reported. In some embodiments, in the four time touch sensing rate, frames 2, 3, and 4 may be reported only when the processing circuit detects that the input object or number of input object changes.

The processing system performs a frame read to obtain the positional information from memory. Then, the processing system processes Sensing Frame 1 to obtain image data defining an image, which is transmitted to the display. Updating the display is not performed until the Vsync signal is transmitted. At transmission of the Vsync signal, the display device as shown in the fourth row (510) starts performing the display update.

As discussed above, at the start of the Vsync wait time, the processing system transmits the Vsync wait information to the processing circuit. The processing circuit uses the Vsync wait information to adjust the sensing delay. As shown in FIG. 5, the sensing delay (512) is increased from the prior sensing delay (511) in the example for the immediate succeeding sensing frame. Because of the increase in the sensing delay, the sensing frame that has positional information reported to the processing system has a decreased Vsync wait time. Thus, the touch-to-display delay is reduced.

By way of a more specific example of FIG. 5, the touch integrated circuit operates in SYNC mode. In the SYNC mode, the Vsync signal causes the touch sensing to operate. For example, if the display frame rate is 120 Hz, one sensing frame per Vsync signal is triggered when touch configuration has a 120 Hz report rate and four touch frames per Vsync signal is triggered in 480 Hz report rate. Thus, the "Sensing Delay" can be changed to ensure the "Vsync_wait" in fixed value. Since the processing system "Frame Processing" time is not identical frame by frame, some time is allowed to adapt the variance.

Figure 6:
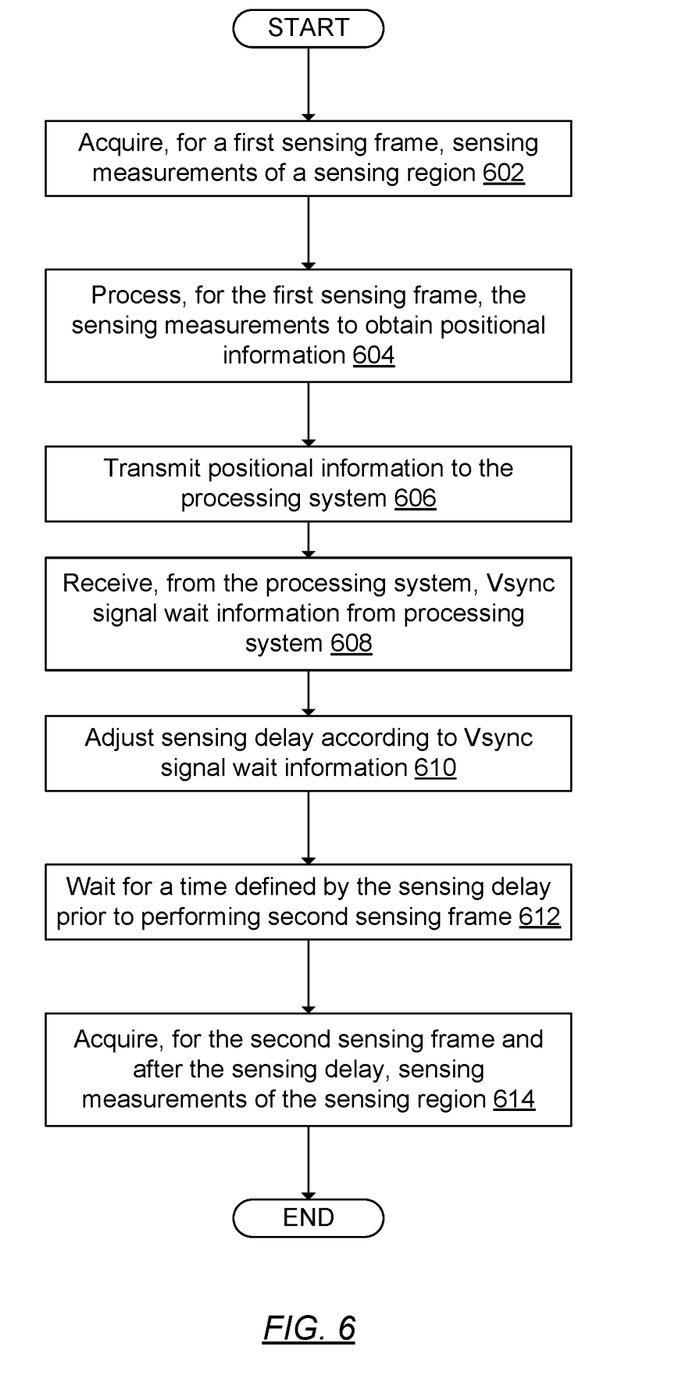
FIG. 6 shows an example flowchart according to one or more embodiments.

FIG. 6 shows a flowchart in accordance with one or more embodiments. In Block 602, the proximity sensing circuit acquires, for a first sensing frame, first sensing measurements of a sensing region. The processing circuit on the proximity sensing circuit manages the timing of the driving of the sensor electrodes. For example, the proximity sensing circuit may calculate the added sensing delay and trigger the first sensing frame when the time of the added sensing delay expires. For capacitive sensing, in response to triggering the driving, the AFE drives the sensor electrodes with capacitive sensing signals and receives the resulting signals from sensor electrodes. The resulting signals are from the capacitive sensing signals and may include the effects of any input object in the sensing region.

In Block 604, the proximity sensing circuit processes, for the first sensing frame, the first sensing measurements to obtain positional information. The processing circuit on the proximity sensing circuit may receive the resulting signals that are processed through the AFE and obtains measurements of the resulting signals. The processing circuit processes the measurements to obtain positional information. While the first sensing measurements are being processed, the AFE and sensor electrodes may continue to capture additional sensing frames depending on the sensing frame rate.

In Block 606, the proximity sensing circuit transmits the positional information to the processing system. When the processing circuit completes storing the positional information in memory, the processing circuit triggers the attn signal. The attn signal interrupts the processing system and causes the processing system to read the positional information from the memory.

The processing system processes the positional information to generate an image. For example, the processing system may use the positional information as an input to a software application being executed. The code of the software application being executed by the processing system specifies the output, which may include storage of information, transmission on a network, and/or update of the graphical user interface. If the graphical user interface is updated, the processing system generates image data for an image of the graphical user interface. Thus, the processing system may transmit the image data to the display driver. The processing system or display driver may wait for the next Vsync signal. Thus, the processing system triggers the display update with the image based on a Vsync signal.

Further, when the processing system completes the generating of the image data, the processing system generates the Vsync wait information based on a time difference from completing processing the positional information to the Vsync signal. The processing system then transmits the Vsync wait information to the proximity sensing controller, such as using a link between the processing system and the proximity sensing controller.

In Block 608, the proximity sensing controller receives, from the processing system, Vsync signal wait information responsive to the positional information.

In Block 610, the processing circuit adjusts a sensing delay according to Vsync signal wait information. In one or more embodiments, the adjustment is a small adjustment based on a function of the Vsync wait time determined from the Vsync wait information. After executing the function, the sensing delay may be increased or decreasing for a next frame or set of frames of capacitive sensing. Further, the adjustment may be performed after Vsync wait information for more than one frame is received. Thus, adjusting the sensing delay according to the Vsync wait information may include combining the Vsync wait information from one frame with the Vsync wait information of one or more other frames, and then adjusting according to the combined Vsync wait information.

In Block 612, after adjusting the sensing delay, the proximity sensing controller waits for a time defined by the sensing delay prior to performing a second sensing frame. The second sensing frame may be in an immediate succeeding set of sensing frames or the immediate succeeding sensing frame from the first sensing frame or a later sensing frame.

In Block 614, after the time, the proximity sensing controller acquires, for the second sensing frame, second sensing measurements of the sensing region. The processing may repeat with Block 604 for the second sensing frame being the first sensing frame. Thus, over time, the sensing delay is updated. Thus, the touch-to-display delay is reduced.

By adding in a sensing delay that is adjustable, one or more embodiments save on electronic system side power consumption and reduce the overall central processor unit usage of the electronic system while decreasing the touch-to-display latency. For example, in a generic scenario, the display refresh rate may operate at 120 Herz (Hz) mode while the proximity frame rate is four times of display refresh rate (480 Hz). If the processing circuit asserts the attn signal to wake up the processing system four times each display frame, the power consumption of the electronic device may be very high because of the constant waking up from the attn signal.

In some cases, if the proximity frame is four times the display frame, only last proximity frame is valid for processing system to generate the new display frame. The initial three sensing frames are still processed by host for application use, although no display is generated. For example, in some action games, touching the key (i.e., a user interface button) in initial three frames means that the action occurred, but the system does not provide the visual feedback for each key touch.

Thus, in the some cases, only the last frame (e.g., frame 4) attention signal is asserted which report the data to host. Because only the last frame is asserted, the last frame should have minimum touch-to-display latency by a tuning of the sensing delay. By having a minimum touch-to-display latency, the display represents the current finger position. In some embodiments, in the above cases, if a new input object is detected in frames 1, 2, or 3, the proximity sensing circuit may assert the attn signal in order to report the new touch data immediately upon detection to increase a response to an input object. However, because the number of input objects generally does not change, the overall host power consumption may remain low. Thus, the new proximity sensing report may be as fast as 480 Hz.

In the above cases, the system may support different modes, such as a power saving mode and a gaming mode. In the gaming mode, new input objects automatically cause a new attn signal to the processing system regardless of the frame. In the power saving mode, only the last frame causes a new attn signal to the processing system.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an "or" may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. An input device comprising:
a proximity sensing panel comprising a plurality of sensor electrodes; and
a proximity sensing circuit configured to:
acquire, for a first sensing frame, first sensing measurements of a sensing region using the plurality of sensor electrodes,
process, for the first sensing frame, the first sensing measurements to obtain positional information,
transmit the positional information to a processing system,
receive, from the processing system, vertical synchronization (Vsync) signal wait information responsive to the positional information, and
adjust a sensing delay according to the Vsync signal wait information,
wherein adjusting the sensing delay comprises shortening a Vsync wait period by adding a separate delay, wherein the separate delay is temporally spaced apart from the Vsync wait period.

2. The input device of claim 1, wherein the proximity sensing circuit is further configured to:
wait, after adjusting the sensing delay, for a time defined by the sensing delay prior to performing a second sensing frame, and
acquire, for the second sensing frame and after the time, second sensing measurements of the sensing region.

3. The input device of claim 1, wherein the Vsync signal wait information defines a time difference between processing the positional information and an update to a display.

4. The input device of claim 1, wherein the processing system is configured to:
process the positional information to generate an image,
trigger a display update with the image based on a Vsync signal, and
generate the Vsync wait information based on a time difference between processing the positional information completes and the Vsync signal.

5. The input device of claim 1, the proximity sensing circuit comprising:
an analog front end configured to:
drive the plurality of sensor electrodes with capacitive sensing signals; and
receive resulting signals from the plurality of sensor electrodes, the resulting signals resulting from the capacitive sensing signals,
a processing circuit configured to process the resulting signals and determine the positional information of an input object.

6. The input device of claim 1, wherein the proximity sensing circuit is further configured to:
perform a set of sensing frames between consecutive Vsync signals,
wherein the sensing delay is performed prior to an initial sensing frame in the set of sensing frames.

7. The input device of claim 6, wherein the initial sensing frame is the first sensing frame.

8. The input device of claim 1, wherein the proximity sensing circuit is further configured to:
perform a set of sensing frames between consecutive Vsync signals,
wherein the sensing delay is performed prior to an intermediate sensing frame in the set of sensing frames.

9. The input device of claim 1, wherein transmitting the positional information comprises:
triggering an attention signal after storing the positional information in memory, wherein the processing system reads the positional information from the memory.

10. The input device of claim 1, wherein adjusting the sensing delay comprises determining a result of a function of a Vsync wait time determined from the Vsync wait information and adding the result to the sensing delay.

11. The input device of claim 1, where in the separate delay is determined based on a percentage of the Vsync wait period.

12. An input-display device comprising:
a proximity sensing panel comprising a plurality of sensor electrodes;
a proximity sensing circuit configured to:
acquire, for a first sensing frame, first sensing measurements of a sensing region using the plurality of sensor electrodes,
transmit positional information determined from the first sensing measurements to a processing system,
receive, from the processing system, vertical synchronization (Vsync) signal wait information responsive to the positional information, and
adjust a sensing delay according to the Vsync signal wait information; and
a display driver configured to display, at a time defined by the Vsync signal wait information, an image generated based on the positional information, wherein adjusting the sensing delay comprises shortening a Vsync wait period by adding a separate delay, wherein the separate delay is temporally spaced apart from the Vsync wait period.

13. The input-display device of claim 12, wherein the proximity sensing circuit is further configured to:
wait, after adjusting the sensing delay, for a time defined by the sensing delay prior to performing a second sensing frame, and
acquire, for the second sensing frame and after the time, second sensing measurements of the sensing region.

14. The input-display device of claim 12, wherein the Vsync signal wait information defines a time difference between processing the positional information completes and an update to a display.

15. The input-display device of claim 12, wherein the proximity sensing circuit is further configured to:
perform a set of sensing frames between consecutive Vsync signals,
wherein the sensing delay is performed prior to an initial sensing frame in the set of sensing frames.

16. The input-display device of claim 15, wherein the initial sensing frame is the first sensing frame.

17. The input-display device of claim 12, wherein the proximity sensing circuit is further configured to:
perform a set of sensing frames between consecutive Vsync signals,
wherein the sensing delay is performed prior to an intermediate sensing frame in the set of sensing frames.

18. The input-display device of claim 12, adjusting the sensing delay comprises determining a result of a function of a wait time in the Vsync signal wait information, and adding the result to the sensing delay.

19. The input-display device of claim 12, where in the separate delay is determined based on a percentage of the Vsync wait period.

20. A method comprising:
- acquiring, for a first sensing frame, first sensing measurements of a sensing region;
- processing, for the first sensing frame, the first sensing measurements to obtain positional information;
- transmitting the positional information to a processing system;
- receiving, from the processing system, vertical synchronization (Vsync) signal wait information responsive to the positional information; and
- adjusting a sensing delay according to the Vsync signal wait information, wherein adjusting the sensing delay comprises shortening a Vsync wait period by adding a separate delay, wherein the separate delay is temporally spaced apart from the Vsync wait period.

21. The method of claim 20, further comprising:
- waiting, after adjusting the sensing delay, for a time defined by the sensing delay prior to performing a second sensing frame, and
- acquiring, for the second sensing frame and after the time, second sensing measurements of the sensing region.

22. The method of claim 20, wherein adjusting the sensing delay comprises determining a result of a function of a wait time in the Vsync signal wait information and adding the result to the sensing delay.

23. The method of claim 20, where in the separate delay is determined based on a percentage of the Vsync wait period.

* * * * *